(12) United States Patent
Fattal et al.

(10) Patent No.: US 8,369,665 B2
(45) Date of Patent: Feb. 5, 2013

(54) HYBRID GUIDED-MODE RESONANCE FILTER AND METHOD EMPLOYING DISTRIBUTED BRAGG REFLECTION

(75) Inventors: David A. Fattal, Mountain View, CA (US); Qianfan Xu, Houston, TX (US); Sagi V. Mathai, Palo Alto, CA (US); Michael R. Tan, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 205 days.

(21) Appl. No.: 13/002,763

(22) PCT Filed: Jul. 14, 2008

(86) PCT No.: PCT/US2008/069991
§ 371 (c)(1),
(2), (4) Date: Mar. 8, 2011

(87) PCT Pub. No.: WO2010/008376
PCT Pub. Date: Jan. 21, 2010

(65) Prior Publication Data
US 2011/0188807 A1    Aug. 4, 2011

(51) Int. Cl.
*G02B 6/34* (2006.01)
(52) U.S. Cl. ........... 385/37; 385/131; 359/568; 359/569
(58) Field of Classification Search ............ 385/37
See application file for complete search history.

(56) References Cited

U.S. PATENT DOCUMENTS

| | | | |
|---|---|---|---|
| 6,154,480 A | 11/2000 | Magnusson et al. | |
| RE38,682 E | 1/2005 | Taylor et al. | |
| 2004/0170356 A1* | 9/2004 | Iazikov et al. | 385/37 |
| 2005/0271091 A1* | 12/2005 | Wang | 372/20 |
| 2012/0105932 A1* | 5/2012 | Ledentsov | 359/263 |

FOREIGN PATENT DOCUMENTS

JP    2000223776    8/2000

OTHER PUBLICATIONS

PCT Search Report and Written Opinion for International Application No. PCT/US2008/069991.

* cited by examiner

*Primary Examiner* — Hemang Sanghavi

(57) ABSTRACT

A hybrid guided-mode resonance (GMR) grating, an optical filter and a method of optical filtering employ distributed Bragg reflection. The hybrid GMR grating includes a waveguide layer that supports a GMR having a GMR resonant frequency. The hybrid GMR grating further includes a diffraction grating that couples a portion of a signal incident on the hybrid GMR grating into the waveguide layer; and a distributed Bragg reflector (DBR) that reflects another portion of the incident signal. The coupled portion of the incident signal has a frequency corresponding to the GMR resonant frequency. The reflected portion has a frequency away from the GMR resonant frequency. The optical filter includes the hybrid GMR grating and a coupler. The method includes coupling an optical signal into the hybrid GMR grating and further coupling a reflected signal out of the hybrid GMR grating.

15 Claims, 5 Drawing Sheets

HYBRID GUIDED-MODE RESONANCE FILTER AND METHOD EMPLOYING DISTRIBUTED BRAGG REFLECTION

CROSS-REFERENCE TO RELATED APPLICATIONS

N/A

STATEMENT REGARDING FEDERALLY SPONSORED RESEARCH OR DEVELOPMENT

N/A

BACKGROUND

1. Technical Field

The invention relates to photonic devices. In particular, the invention relates to photonic devices employed as filters and modulators.

2. Description of Related Art

Optical filters and related components such as, but not limited to, optical modulators that employ filtering are critical components in virtually all photonic systems. For example, various forms of filtering are typically employed to separate out individual signals for selective processing from a group of signals carried by a broadband frequency multiplexed optical carrier. Optical filters, like other types of filters, may be generally classified as either broad band or narrow band and may be realized as one of a lowpass filter, a bandpass filter, a band reject or notch filter, and a high pass filter. Of particular interest to many frequency multiplexing applications are narrow bandpass and band reject filters. For example, a narrow bandpass filter may be used to select a particular signal or signal channel from among a group of such signals in a broadband carrier. In another example, a narrowband notch filter may be employed to remove a single signal or signal channel from such a broadband carrier, for example. Similarly, modulators that employ narrowband filtering may selectively modulate such a single signal or signal channel.

A wide variety of filters are used in photonic systems. Recently, guided-mode resonant (GMR) gratings have attracted considerable interest as a means for providing narrowband filtering. GMR gratings may be realized that exhibit a very sharp, narrowband, high-Q coupling between an incident signal and a guided mode of the GMR grating. The coupling has been employed to implement narrowband transmission and narrowband reflection (i.e., rejection) filters. In addition, both transmissive and reflective modulators using GMR gratings have been demonstrated.

Unfortunately, while exhibiting very good coupling in a narrowband frequency band around a GMR resonant frequency of the GMR grating, an out-of-band reflection response of the GMR grating typically degrades significantly away from the GMR resonant frequency. This degradation in the out-of-band reflection response may significantly limit the utility of filters and modulators that are implemented using a GMR grating. Therefore, providing a GMR grating having a relatively wide and flat reflection response out-of-band while still providing high-Q performance in-band would satisfy a long felt need.

BRIEF SUMMARY

In some embodiments of the present invention, a hybrid guided-mode resonance (GMR) grating is provided. The hybrid GMR grating comprises a waveguide layer that supports a guided-mode resonance (GMR) having a GMR resonant frequency. The hybrid GMR grating further comprises a diffraction grating that couples a portion of a signal incident on the hybrid GMR grating into the waveguide layer. The coupled portion has a frequency corresponding to the GMR resonant frequency. The hybrid GMR grating further comprises a distributed Bragg reflector (DBR) that reflects another portion of the incident signal. The other portion has a frequency that is away from the GMR resonant frequency.

In other embodiments of the present invention, an optical filter is provided. The optical filter comprises a coupler that receives an optical signal. The optical filter further comprises a hybrid guided-mode resonance (GMR) grating. The hybrid GMR grating comprises a GMR grating having a first GMR resonant frequency and a distributed Bragg reflector (DBR). One of (a) the DBR is between a diffraction grating and a waveguide layer of the GMR grating and (b) the waveguide layer is between the diffraction grating and the DBR. The coupler couples the received optical signal into the hybrid GMR grating and further receives and couples out a reflected signal from the hybrid GMR grating.

In other embodiments of the present invention, a method of optical filtering is provided. The method of optical filtering comprises exciting a guided-mode resonance (GMR) in a GMR grating by coupling a first signal portion of an input signal into a waveguide layer of the GMR grating using a diffraction grating of the GMR grating. The first signal portion has a frequency within a coupling bandwidth of a GMR resonant frequency of the GMR grating. The method of optical filtering further comprises reflecting a second signal portion of the input signal at a frequency that that is outside of the coupling bandwidth of the GMR resonant frequency. Distributed Bragg reflection of a distributed Bragg reflector (DBR) is used for reflecting a second signal portion. The second signal portion is a reflected signal. Either the DBR is between the diffraction grating and the waveguide layer or the waveguide layer is between the diffraction grating and the DBR.

Certain embodiments of the present invention have other features that are one or both of in addition to and in lieu of the features described hereinabove. These and other features of the invention are detailed below with reference to the following drawings.

BRIEF DESCRIPTION OF THE DRAWINGS

The various features of embodiments of the present invention may be more readily understood with reference to the following detailed description taken in conjunction with the accompanying drawings, where like reference numerals designate like structural elements, and in which.

DETAILED DESCRIPTION

Figure 1:
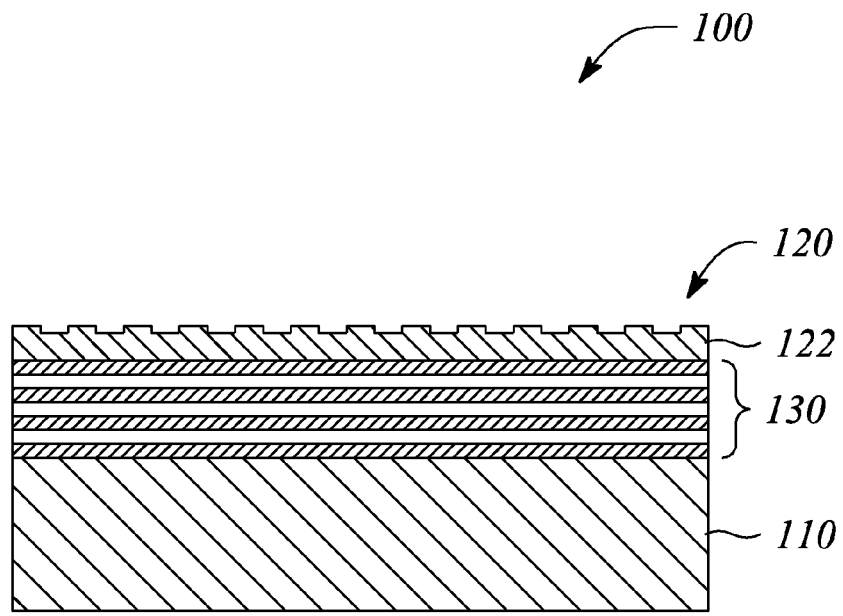
FIG. 1 illustrates a cross sectional view of a hybrid guided-mode resonance grating, according to an embodiment of the present invention.

Embodiments of the present invention provide a hybrid guided-mode resonance (GMR) grating that employs distributed Bragg reflection to extend and enhance an out-of-band reflection response. In particular, the distributed Bragg reflection employed in the hybrid GMR grating provides a relatively broad and essentially flat reflection response outside of or beyond a GMR frequency band of the hybrid GMR grating, according to the present invention. Concomitantly, the hybrid GMR grating exhibits a coupled response within the GMR frequency band that is essentially similar to or that effectively mimics the response of a conventional GMR grating. The relatively broad and flat reflection response facilitates using the hybrid GMR grating in various filter and modulator applications, according to various embodiments. For example, the relatively broad and flat reflection response may facilitate implementing cascaded multi-frequency narrowband filters (e.g., frequency multiplexers) and frequency selective modulators.

According to various embodiments, the hybrid GMR grating of the present invention comprises a distributed Bragg reflector (DBR). In some embodiments, the DBR is interposed between a diffraction grating and a waveguide layer that supports a guided-mode resonance. In some embodiments, the waveguide layer is interposed between the diffraction grating and the DBR. In other embodiments, one or both of the diffraction grating and the DBR are embedded in the waveguide layer. The DBR reflects signals across a relatively broad frequency range or bandwidth consistent with the distributed Bragg reflection afforded by the DBR. However, at or in a vicinity of a frequency corresponding to the supported guided-mode resonance (i.e., within the GMR frequency band), a combined action of the diffraction grating and the waveguide layer essentially defeats the distributed Bragg reflection and the hybrid GMR grating essentially functions as a conventional GMR grating. In other words, the hybrid GMR grating functions as if the DBR were essentially absent at the center of the GMR frequency band. On the other hand, beyond the GMR frequency band, the hybrid GMR grating functions essentially according to or consistent with the DBR.

In various embodiments, the hybrid GMR grating according to the present invention may be integrated onto or into essentially any surface and generally utilizes a relatively small form factor or foot print on the surface. In particular, the hybrid GMR grating may be fabricated using many conventional manufacturing methodologies including, but not limited to, one or both of microlithography-based surface patterning and nanolithography-based surface patterning, used in circuit fabrication. For example, conventional semiconductor manufacturing techniques (e.g., a CMOS compatible fabrication process) may be employed to create a hybrid GMR grating on or in a surface of a photonic integrated circuit (IC). As such, a filter or a modulator employing the hybrid GMR grating of the various embodiments of the present invention may be readily integrated with conventional photonic elements and circuitry on an IC. Moreover, such an exemplary IC-based filter or modulator may be realized within a surface footprint as small as one square millimeter (mm) or less, for example, using currently available manufacturing methods.

As used herein, a 'guided-mode resonance' is defined as an anomalous resonance excited in, and simultaneously extracted from, a waveguide by a phase-matching element such as a diffraction grating. An excitation signal or wave (e.g., light) incident on the diffraction grating is coupled into and is essentially, but generally temporarily, 'trapped' as energy in a resonance mode in the waveguide under some circumstances, such as certain combinations of angle of incidence and signal wavelength. The resonance mode may manifest as an excitation of surface waves (i.e., surface plasmon) on a surface of a metallic grating or as a resonant wave (e.g., guided-mode or quasi guided-mode) within a body of a dielectric layer of the waveguide (e.g., as exemplified by various embodiments of the present invention), for example. The trapped energy may subsequently escape from the waveguide and combine one or both of constructively and destructively with either a signal reflected by the grating or a signal transmitted through the grating. Guided-mode resonances are also often referred to as 'leaky resonances'.

A 'guided-mode resonance (GMR) grating' as used herein is defined as any diffraction grating coupled with a waveguide that can support a guided-mode resonance. Conventional GMR gratings are also known and referred to as 'resonant grating waveguides' and 'dielectric waveguide gratings'. For example, an optical GMR grating may comprise a dielectric slab waveguide with a diffraction grating formed in or on a surface layer thereof. The diffraction grating may comprise grooves or ridges formed on a surface of the dielectric slab. In another example, the GMR grating is a planar dielectric sheet having a periodically alternating refractive index (e.g., phase grating) within the dielectric sheet. An exemplary phase grating may be formed by forming a periodic array of holes in and through the dielectric sheet. A signal incident on the surface of a GMR grating that excites a guided-mode resonance therein may be simultaneously extracted as one or both of a reflected signal (i.e., reflected waves) that reflects from an incident surface of the GMR grating and a transmitted signal (i.e., transmitted waves) that passes through the GMR grating and out a side of the GMR grating that is opposite the incident surface.

In various embodiments, the hybrid GMR grating may comprise either a 1-dimensional (1D) diffraction grating or a 2-dimensional diffraction grating. A 1D diffraction grating may comprise a set of parallel and essentially straight grooves that are periodic only in a first direction (e.g., along an x-axis), for example. An example of a 2D diffraction grating comprises an array of holes in a dielectric slab or sheet where the holes are periodically spaced along two orthogonal directions (e.g., along both an x-axis and a y-axis). A further discussion of GMR gratings and guided-mode resonance that applies to the hybrid GMR grating of the present invention may be found, for example, in Magnusson et al., U.S. Pat. No. 5,216,680 and Wawro et al., U.S. Pat. No. 7,167,615, both of which are incorporated by reference in their entirety herein.

Among the characteristics of a conventional GMR grating, and by direct extension, the hybrid GMR grating of the present invention within the GMR frequency band, is an angular relationship between an angle of incidence of an incident wave and a response of the GMR grating. The response may be either a reflection response or a transmission response. Consider an exemplary 1D hybrid GMR grating comprising a relatively shallow or thin dielectric layer and having a grating period Λ according to some embodiments of the present invention. A planar wave-vector β as a function of a free-space wavelength λ of an incident wave for the exemplary 1D grating is given by a dispersion relation of equation (1).

$$\beta(\lambda) = n_{\mathit{eff}}(\lambda)\frac{2\pi}{\lambda} \quad (1)$$

where $n_{\mathit{eff}}(\lambda)$ is an effective refractive index of a guided mode of the grating. The effective refractive index $n_{\mathit{eff}}(\lambda)$ is a weighted average of refractive indices of materials in which a guided-mode propagates within the 1D GMR grating. An interaction between quasi-guided modes of planar momentum within the 1D GMR grating and an incident wave (e.g., a beam of light) of wavelength λ may be described in terms of an integer mode m by equation (2)

$$\beta_m(\lambda, \theta) = \frac{2\pi n}{\lambda}\sin(\theta) + \frac{2\pi m}{\Lambda} \quad (2)$$

where the incident wave is incident from a medium having a refractive index n and has an angle of incidence θ and where Λ is the period of the 1D GMR grating. The interaction produces a guided-mode resonance response of the 1D GMR grating. For the exemplary 1D GMR grating, an incident signal at a normal angle of incidence (i.e., θ=0 degrees) couples into a slab mode of the 1D GMR grating with a momentum of +/−2π/Λ. Thus, a resonance occurs at $\lambda=\Lambda \cdot n_{\mathit{eff}}(\lambda)$.

As such, the guided-mode resonance response of the exemplary 1D GMR grating is a function of both the wavelength λ and the angle of incidence θ. In some embodiments, the guided-mode resonance response is a reflection response while in other embodiments, the guided-mode response is a transmission response of the 1D GMR grating. Herein, the angle of incidence θ is defined as an angle between a principal incident direction of the incident wave and a plane perpendicular to a surface of the GMR grating.

Further herein, a 'distributed Bragg reflector' also known as a 'Bragg mirror' is defined as a reflective structure, element, or layer comprising a plurality of layers of materials having differing refractive indices. The differing refractive indices of the material layers produce a variation (e.g., a periodic variation) in an effective refractive index across the layers. The variation in the effective refractive index of the combined material layers of the plurality may reflect an electromagnetic wave or signal propagating across or through the layers.

In particular, a material discontinuity at a boundary between a pair of material layers within the distributed Bragg reflector produces a partial reflection of the propagating electromagnetic signal. Material discontinuities at successive additional layer-pair boundaries of material layers in the plurality of layers produce additional partial reflections. The various partial reflections may add constructively such that a combined reflection of the electromagnetic signal is relatively a strong or essentially total reflection, in some embodiments.

For example, the distributed Bragg reflector may comprise layers of materials having refractive indices that periodically alternate between a relatively higher refractive index and a relatively lower refractive index. The periodic variation of the effective index of refraction of the layers produces a reflection of an electromagnetic signal propagating across the layers. When a thickness of the periodic layers is one quarter wavelength of the propagating electromagnetic signal in a direction of propagation, the resulting reflection may be an essentially total reflection.

In general, a reflectivity R of the distributed Bragg reflector increases both as a relative difference between the layer-pair refractive indices at the boundaries (i.e., increasing a refractive index contrast) increases and as a number of layers increases. For example, for a distributed Bragg reflector comprising two alternating layers, the reflectivity R is given by equation (3)

$$R = \left[\frac{n_0(n_2)^{2N} - n_s(n_1)^{2N}}{n_0(n_2)^{2N} + n_s(n_1)^{2N}}\right] \quad (3)$$

where $n_0$ is a refractive index of a surrounding material above the distributed Bragg reflector, $n_s$ is a refractive index of a substrate below the distributed Bragg reflector, and N is a number of repeating pairs of the two alternating of material layers and $n_1$, $n_2$ are respective refractive indices of the two alternating layers. The distributed Bragg reflector may provide a relatively broad bandwidth of strong reflection. For example, a photonic stopband $\Delta v_0$ for the above exemplary distributed Bragg reflector with two alternating layers is given by equation (4)

$$\Delta v_0 = \frac{4 v_0}{\pi}\left[\frac{n_2 - n_1}{n_2 + n_1}\right] \quad (4)$$

where $v_0$ is a central frequency of the band. As exemplified by equation (4), increasing one or both of a number of layers and a refractive index contrast between the layers also increases the bandwidth of the photonic stopband $\Delta v_0$.

For simplicity herein, no distinction is made between a substrate or slab and any layer or structure on the substrate/slab unless such a distinction is necessary for proper understanding. Likewise, all diffraction gratings are referred to generically unless a distinction is necessary for proper understanding. Further, as used herein, the article 'a' is intended to have its ordinary meaning in the patent arts, namely 'one or more'. For example, 'a layer' generally means one or more layers and as such, 'the layer' means 'the layer(s)' herein. Also, any reference herein to 'top', 'bottom', 'upper', 'lower', 'up', 'down', 'left' or 'right' is not intended to be a limitation herein. Moreover, examples herein are intended to be illustrative only and are presented for discussion purposes and not by way of limitation.

Further and by way of definition, reference herein to a structure or layer being 'between' other structures or layers is defined to explicitly include in its scope one or both 'adjacent to' and 'within' or equivalently 'embedded within'. Thus, a structure that is 'between' two other structures may be one of adjacent to and partially or completely within one or both of the other structures as defined herein. For example, a first layer that is between a second layer and a third layer may be a separate layer from one or both of the second layer and the third layer and is adjacent to the second and third layers. As such, the first layer may be bounded on one side by the second layer and bounded on an opposite side by the third layer (e.g., adjacent to). In another example, the first layer may be between the second and the third layer in that the first layer may be essentially within one or both of the second and third layers.

FIG. 1 illustrates a cross sectional view of a hybrid guided-mode resonance grating 100, according to an embodiment of the present invention. The hybrid guided-mode resonance (GMR) grating 100 couples a portion of an incident signal into a GMR mode. The coupled portion has a frequency corresponding to a GMR resonant frequency of the hybrid GMR grating 100. By 'corresponding to,' it is meant herein that the frequency is one or both of within a frequency range of the GMR resonant frequency and equivalent to the GMR resonant frequency. By 'within a frequency range,' it is meant that the frequency is within a coupling bandwidth of the GMR resonant frequency. The hybrid GMR grating 100 further reflects another portion of the incident signal having a frequency that is away from the GMR resonant frequency. By 'away from,' it is meant herein that the frequency is one or both of outside the frequency range of and nonequivalent to (i.e., differs from) the GMR resonant frequency. In some embodiments, the coupled portion is referred to as a transmitted signal. In particular, in some embodiments, the coupled portion transits or essentially passes through the hybrid GMR grating 100 to emerge (i.e., be emitted) from a backside of the GMR grating opposite an incident side thereof as the transmitted signal. The reflected portion may be referred to as a reflected signal, in some embodiments.

The hybrid GMR grating 100 comprises a waveguide layer 110. The waveguide layer 110 supports a guided mode resonance at a GMR resonant frequency. For example, the waveguide layer 110 may comprise a layer of a dielectric material. The exemplary layer of dielectric material may be a layer deposited on or otherwise supported by a substrate (not illustrated), for example. In such an exemplary configuration, the waveguide layer 110 and the substrate have different refractive indices. Specifically, the refractive index of the waveguide layer 110 is greater than the refractive index of the substrate.

In some embodiments, the waveguide layer 110 comprises a material that has relatively low loss. That is, the material is essentially lossless at a frequency of the incident signal. As such, essentially all of the coupled portion of the signal may be emitted substantially unchanged in amplitude. For example, the transmitted signal may be an output of a multiplexer filter employing the hybrid GMR grating 100. In such an exemplary application, the material of the waveguide layer 110 may be chosen to introduce minimal loss (e.g., <1 dB) to the coupled portion of the incident signal to preserve a power level of the transmitted signal, for example.

In other embodiments, the waveguide layer 110 comprises an absorber (not illustrated) that absorbs all or most of the coupled portion of the incident signal. In such embodiments, the coupled portion that enters the waveguide layer 110 is generally dissipated (e.g., as heat) within the waveguide layer 110 and does not result in the transmitted signal. For example, the hybrid GMR grating 100 may be employed as an absorptive notch filter that removes the coupled portion from the incident signal leaving only the reflected signal. In some embodiments, an absorption (i.e., an absorption level or amount) of the absorber of the waveguide layer 110 is controllable. In such embodiments, the hybrid GMR grating 100 may function as a modulator of the coupled signal where a modulation is controlled by controlling the absorption and/or a resonant frequency the hybrid GMR grating 100.

For example, charge injection into a semiconductor material of the waveguide layer 110 may be employed to change a dielectric constant of the waveguide layer 110. The exemplary change in dielectric constant, in turn, may induce a change in the resonant frequency of the hybrid GMR grating 100. The resonant frequency shift may be used to modulate the coupled signal. Similar approaches may be employed to control the absorption.

The hybrid GMR grating 100 further comprises a diffraction grating layer or diffraction grating 120. The diffraction grating 120 is adjacent to a surface of the waveguide layer 110. By 'adjacent to,' it is meant either directly or indirectly adjacent to the waveguide layer 110. In some embodiments, the diffraction grating 120 is superposed to the waveguide layer 110. For example, the diffraction grating 120 may lie above the waveguide layer 110 as illustrated in FIG. 1 and be formed in a top surface layer 122. The top surface layer 122 may comprise a deposited and formed layer of a dielectric material, for example. In particular, the diffraction grating 120 may be a planar diffraction grating 120 comprising an array of grating elements formed in or on a surface of the hybrid GMR grating 100 that is also essentially planar, in some embodiments.

The hybrid GMR grating 100 further comprises a distributed Bragg diffraction (DBR) layer or DBR 130. FIG. 1 illustrates that the DBR 130 is interposed between the waveguide layer 110 and the diffraction grating 120, according to some embodiments. In other words, the DBR 130 is essentially sandwiched between the waveguide layer 110 and diffraction grating 120 in some embodiments. As such, a signal that interacts with and is scattered by the diffraction grating 120 encounters the DBR 130 before entering and possibly being guided by the waveguide layer 110.

In some embodiments, the DBR 130 comprises a plurality of layers of dielectric material, adjacent layers having different refractive indexes. Essentially any distributed Bragg diffraction structure may be employed as the DBR 130. For example, the DBR 130 may comprise successive layers of silicon dioxide ($SiO_2$) and titanium dioxide ($TiO_2$) each layer having a thickness of about one quarter of a wavelength of a central frequency of the incident signal. There may be as few as about 2 successive layers and as many as 10 or more successive layers (e.g., 8 layers) in the plurality of layer of dielectric material, for example. As discussed above, more layers results in better reflection and a wider reflection bandwidth, in general.

Figure 2A:
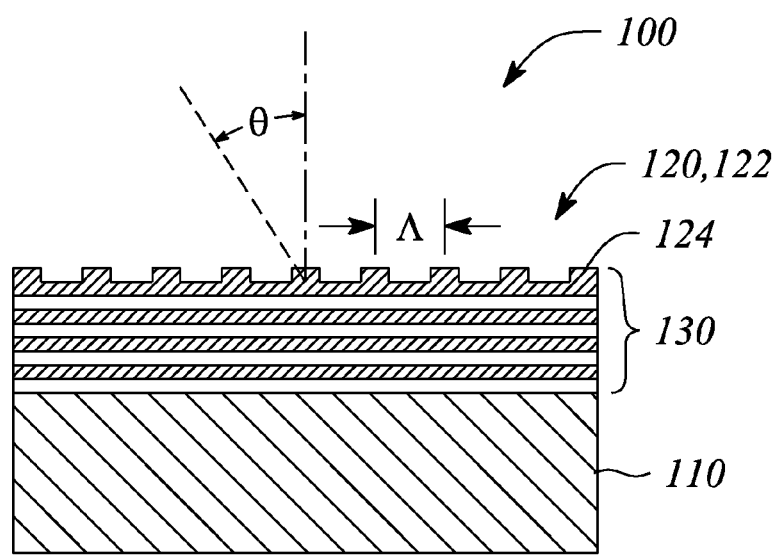
FIG. 2A illustrates a cross sectional view of a 1D GMR hybrid grating, according to an embodiment of the present invention.

In some embodiments, the hybrid GMR grating 100 comprises a 1D diffraction grating 120 of grating period $\Lambda$. Such embodiments are termed a '1D hybrid GMR grating' herein. FIG. 2A illustrates a cross sectional view of a 1D hybrid GMR grating 100, according to an embodiment of the present invention. As illustrated, the 1D hybrid GMR grating 100 comprises a diffraction grating 120 formed on or in a top surface layer 122. For example, the top surface layer 122 may comprise a dielectric layer overlying the DBR 130 (e.g., as illustrated in FIG. 1). In another example, the top surface layer 122 may comprise a first or top layer of the DBR 130 (e.g., as illustrated in FIG. 2A) such that the diffraction grating 120 is essentially formed within the top layer of the DBR 130. Note that while the diffraction grating 120 is formed within a layer of the DBR 130, the DBR 130 is still between the diffraction grating 120 and waveguide layer 110, in accordance with the definition of 'between' provided herein.

The diffraction grating 120 may be formed in the top surface layer 122 as periodically spaced apart grating elements 124 that may be one or both of ridges and grooves with the grating period $\Lambda$, for example. The grating elements 124 may be formed mechanically by molding or etching, for example. Alternatively, the grating elements 124 may be formed by depositing and patterning another material (e.g., a dielectric or a metal) on the top surface layer 122.

Figure 2B:
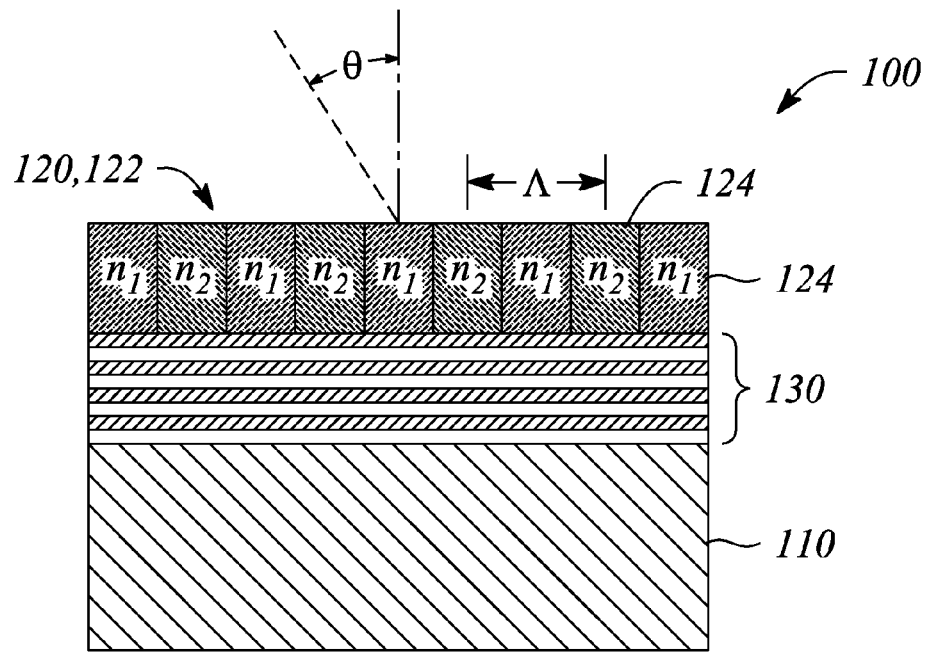
FIG. 2B illustrates a cross sectional view of a 1D hybrid GMR grating, according to another embodiment of the present invention.

FIG. 2B illustrates a cross sectional view of a 1D hybrid GMR grating 100, according to another embodiment of the present invention. As illustrated, the 1D hybrid GMR grating 100 comprises the waveguide layer 110, the top surface layer 122 that provides the diffraction grating 120, and the DBR 130 located between the top surface layer 122 and the waveguide layer 110, as described above. According to the embodiment of FIG. 2B, the diffraction grating 120 comprises grating elements formed as periodically alternating strips 124 of a first dielectric material and a second dielectric material within the top surface layer 122. In such embodiments, the top surface layer 122 is generally a dielectric slab that is superposed to the DBR 130.

The strips 124 are periodically spaced apart at the grating period Λ and are essentially parallel to one another. In some embodiments, a width measured in a direction of the grating period Λ (i.e., in a direction of alternation of the strips) is essentially the same from one strip 124 to the next. A refractive index $n_1$ of the first dielectric material differs from a refractive index $n_2$ of the second dielectric material, which results in a periodically alternating refractive index along the direction of the grating period Λ. The periodically alternating refractive indices produce the diffraction grating 120 within the dielectric slab of the top surface layer 122.

In some embodiments, the waveguide layer 110, the diffraction grating 120, and DBR 130 are formed as distinct and separate layers (e.g., see FIGS. 1 and 2B). In other embodiments, one or more of the waveguide layer 110, the diffraction grating 120, and the DBR 130 are realized or formed together as a single element having multiple functions. For example, the diffraction grating 120 may be formed into or within a top surface layer 122 of the DBR 130, as is described above with respect to FIG. 2A.

Figure 2C:
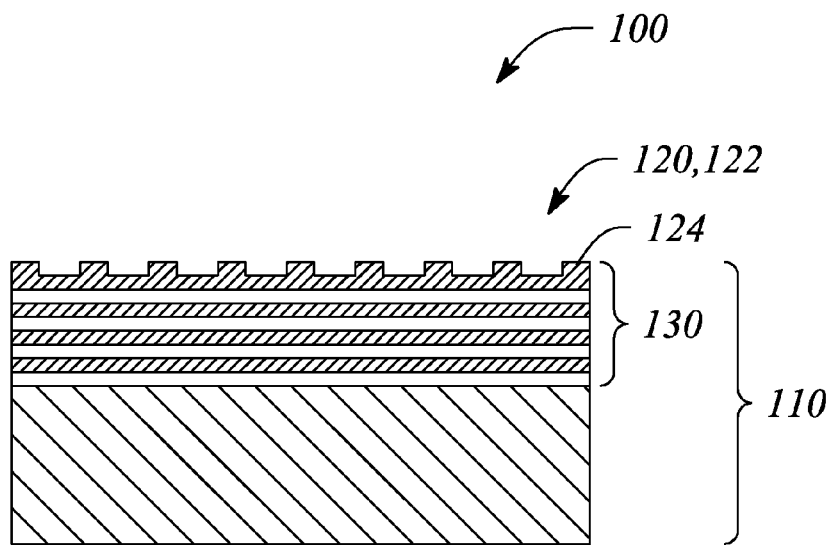
FIG. 2C illustrates a cross sectional view of a 1D hybrid GMR grating, according to another embodiment of the present invention.

FIG. 2C illustrates a cross sectional view of a 1D hybrid GMR grating 100, according to another embodiment of the present invention. In particular, as illustrated the 1D hybrid GMR grating 100 comprises the DBR 130 formed within the waveguide layer 110. Further, the diffraction grating 120 is formed into a surface of the waveguide layer 110 which is also a top surface of the DBR 130. As such, the diffraction grating 120 and DBR 130 are essentially integral to and within the waveguide layer 110. Moreover, the DBR 130 is between the waveguide layer 110 and the diffraction grating 120 in the 1D hybrid GMR grating 100 illustrated in FIG. 2C, in accordance with the definition of 'between' provided herein.

Figure 2D:
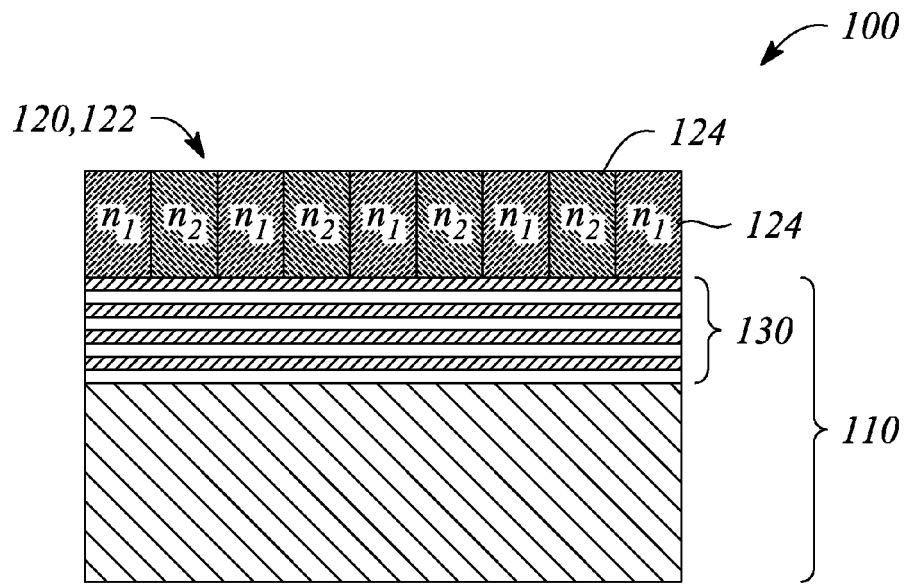
FIG. 2D illustrates a cross sectional view of a 1D hybrid GMR grating, according to another embodiment of the present invention.

FIG. 2D illustrates a cross sectional view of a 1D hybrid GMR grating 100, according to another embodiment of the present invention. As illustrated in FIG. 2D, the DBR 130 is formed within the waveguide layer 110 while the diffraction grating 120 is a top surface layer 122 on the waveguide layer 110. Concomitantly, the diffraction grating 120 is on the DBR 130 as well. In some of these embodiments (not illustrated), the DBR 130 and waveguide layer 110 may be essentially coextensive (i.e., DBR 130 is essentially also the waveguide layer 110). As such, even though the DBR 130 and waveguide layer 110 may be coextensive, the DBR 130 is still considered to be 'between' the diffraction grating 120 and the waveguide layer 110, as defined herein. Moreover, while illustrated in FIG. 2D as alternating dielectric strips (e.g., similar to FIG. 2B), the diffraction grating 120 of the top surface layer 122 alternatively may be essentially any diffraction grating (e.g., grooves, ridges, holes, strips, etc.).

Figure 2E:
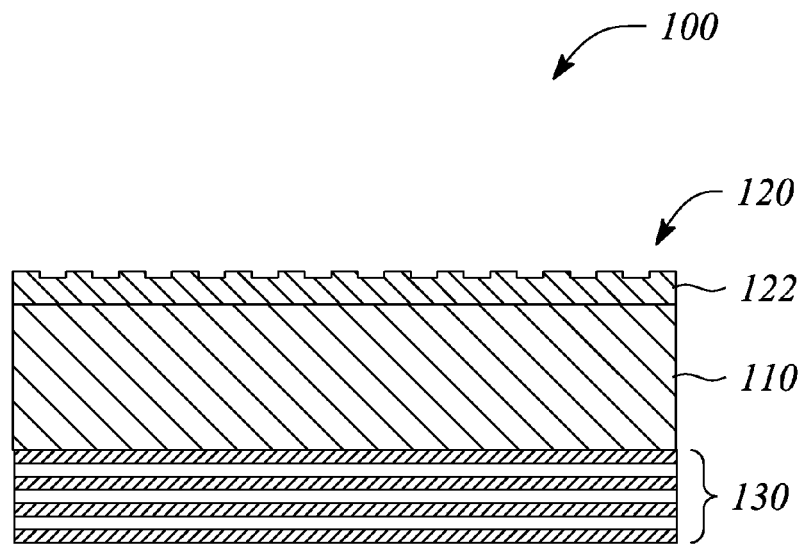
FIG. 2E illustrates a cross sectional view of a 1D hybrid GMR grating, according to another embodiment of the present invention.

FIG. 2E illustrates a cross sectional view of a 1D hybrid GMR grating 100, according to another embodiment of the present invention. As illustrated in FIG. 2E, the DBR 130 is adjacent to a back side of the waveguide layer 110, while the diffraction grating 120 is adjacent to an opposite or front side of the waveguide layer 110. Thus, the waveguide layer 110 is sandwiched between the diffraction grating 120 and the DBR 130. Other configurations (not illustrated) are also possible and are within the scope of the present invention including, but not limited to, the waveguide layer, the DBR and the diffraction grating all being essentially coextensive.

Figure 3:
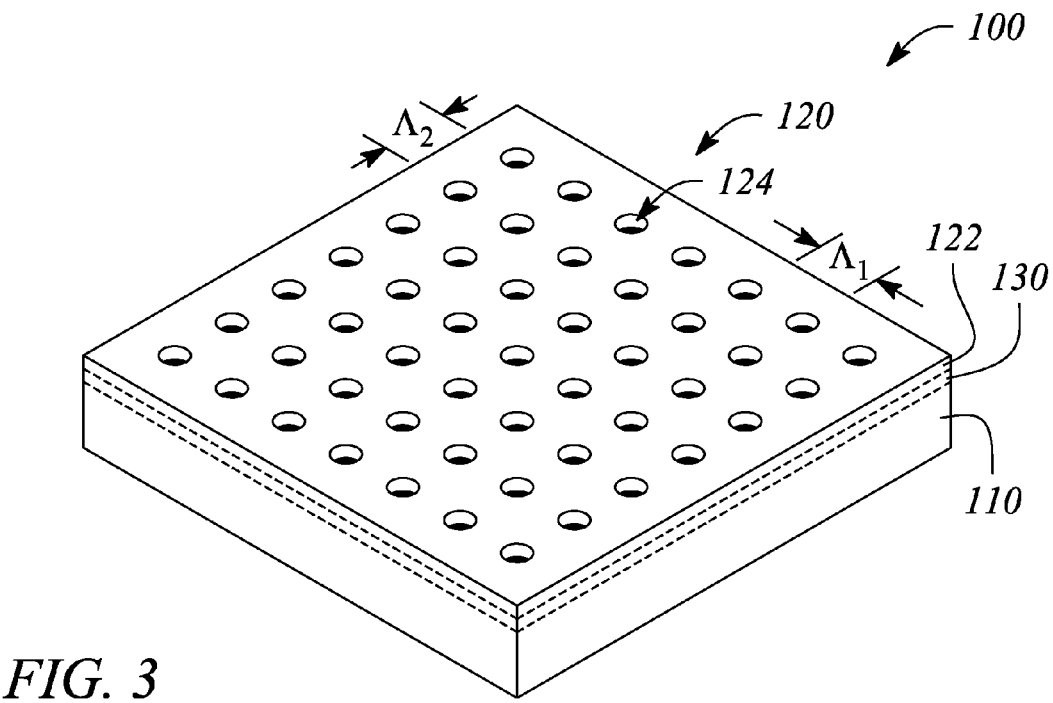
FIG. 3 illustrates a perspective view of a 2D hybrid GMR grating, according to an embodiment of the present invention.

In other embodiments, the hybrid GMR grating 100 comprises a 2D diffraction grating and is referred to herein as a '2D hybrid GMR grating' 100. FIG. 3 illustrates a perspective view of a 2D hybrid GMR grating 100, according to an embodiment of the present invention. The 2D hybrid GMR grating 100 comprises the waveguide layer 110, the DBR 130 and the top surface layer 122, as described above. As illustrated by way of example in FIG. 3, the diffraction grating 120 comprises a 2D periodic array of holes 124 formed in the top surface layer 122. The 2D periodic array of holes 124 has a 2-dimensional period Λ that introduces a periodically repeating refractive index discontinuity in the top surface layer 122. The periodically repeating refractive index discontinuity produces the diffraction grating 120.

For example, the hybrid GMR grating 100 may comprise a silicon on insulator (SOI) wafer and the diffraction grating 120 may comprise a square lattice of holes etched in the top surface layer 122 comprising a surface layer of the silicon (Si). In this example, the holes may have a diameter of about 400 nanometers (nm) and be etched to a depth of about 25 nm. A spacing between, or period Λ of, the holes in the square lattice may be about 1.05 micron (μm) (i.e., where $Λ=Λ_1=Λ_2$). In this example, the top surface layer 122 of Si may have a thickness of about 50 nm.

While illustrated in FIG. 3 as holes, the 2D diffraction grating 120 may be produced by essentially any means for introducing a 2D periodically repeating discontinuity in the top surface layer 122. For example, the holes described above may be filled with a dielectric material of a different refractive index (e.g., $SiO_2$) than that of the dielectric slab of the top surface layer 122 (e.g., Si). In another example, the 2D diffraction grating 120 is provided by holes or filled holes (e.g., dielectric plugs) that extend completely through an entire thickness of the top surface layer 122 or even through an entire thickness of the hybrid GMR grating 100. In yet another example, an array of protruding surface features (e.g., bumps) may be employed as the 2D diffraction grating 120. In some embodiments, a grating period $Λ_1$ of the 2D diffraction grating 120 may be different in a first direction (e.g., x-axis) of the periodic array from a grating period $Λ_2$ in a second direction (e.g., y-axis) of the periodic array.

Figure 4:
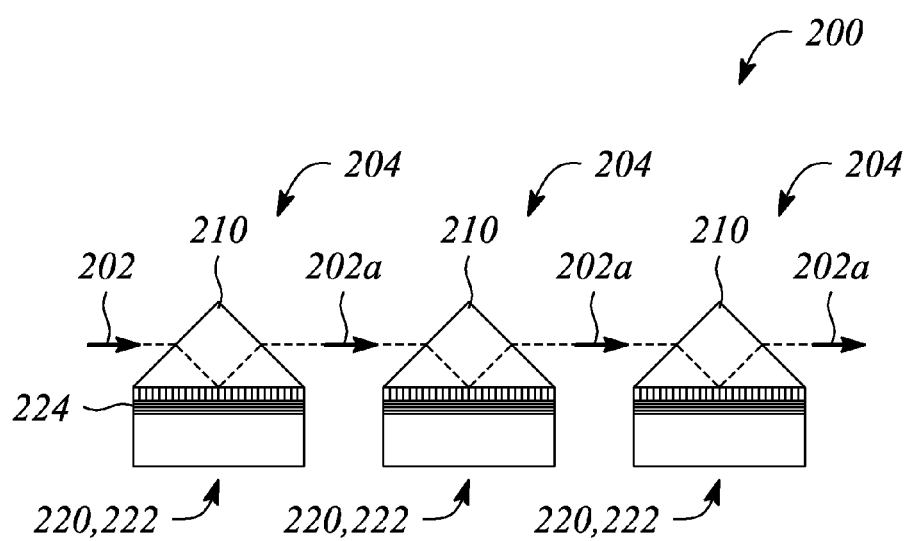
FIG. 4 illustrates a block diagram of an optical filter 200, according to an embodiment of the present invention.

FIG. 4 illustrates a block diagram of an optical filter 200, according to an embodiment of the present invention. The optical filter 200 receives and filters an input signal 202. The optical filter 200 of FIG. 4 is illustrated by way of example as a cascaded optical filter 200. In particular, the optical filter 200 comprises a plurality of filter stages 204 that are arranged in a cascade. Each filter stage 204 of the cascaded optical filter 200, except a first stage 204, receives and filters an output signal 202a (e.g., the reflected signal) of a preceding filter stage 204. The first stage 204 receives the input signal 202 directly.

As illustrated in FIG. 4, the optical filter 200 comprises a coupler 210 associated with each stage 204. The coupler 210 receives an optical signal. For example, as illustrated in FIG. 4, the received optical signal is either the input signal 202 or an output signal 202a of a preceding filter stage 204. The coupler 210 may be a prism, for example, as is illustrated in FIG. 4.

The optical filter 200 further comprises a hybrid guided-mode resonance (GMR) grating 220 for each stage 204. The hybrid GMR grating 220 comprises a GMR grating 222 having a first GMR resonant frequency. The hybrid GMR grating 220 further comprises a distributed Bragg reflector (DBR) (or equivalently DBR layer) 224. In some embodiments, the DBR 224 is sandwiched between a diffraction grating and a waveguide layer of the GMR grating 222. In other embodiments, the waveguide layer is between the diffraction grating and the DBR 224. In some embodiments, the hybrid GMR grating 220 is essentially similar to any of the embodiments of the hybrid GMR grating 100 described above.

The coupler 210 couples the received optical signal 202, 202a into the hybrid GMR grating 220. The coupler 210 further receives and couples out a reflected signal (e.g., the output signal 202a) from the hybrid GMR grating 220. The filter stage 204 comprises a combination of a coupler 210 and a hybrid GMR grating 220. While illustrated in FIG. 4 as a multistage cascaded optical filter 200, in general the optical filter 200 may comprise as few or as many filter stages 204 as is dictated by a particular optical filtering application. For example, in some embodiments, the optical filter 200 may comprise a single filter stage 204. In another example (as illustrated in FIG. 4), the optical filter 200 may comprise more than two filter stages 204. In this example, at least one filter stage 204 comprises a hybrid GMR grating 220 having a different GMR resonant frequency as described herein according to the various embodiments. As such, the cascaded optical filter 200 may function as a frequency multiplexer. For example, each particular filter stage 204 may selectively couple and essentially remove from the input signal 202 a particular frequency component or band of frequencies corresponding to the GMR resonant frequency of that filter stage 204.

Figure 5:
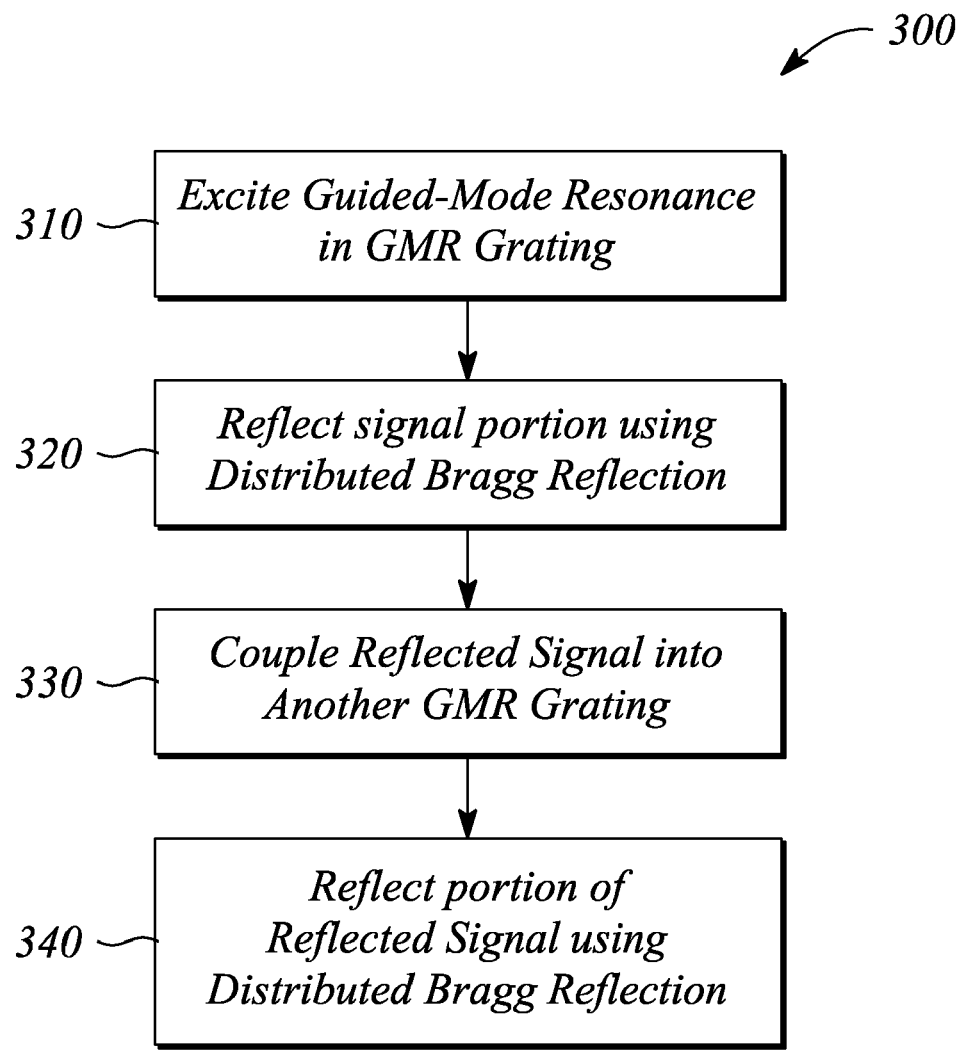
FIG. 5 illustrates a flow chart of a method of optical filtering, according to an embodiment of the present invention.

FIG. 5 illustrates a flow chart of a method 300 of optical filtering, according to an embodiment of the present invention. The method 300 of optical filtering comprises exciting 310 a guided mode resonance (GMR) in a hybrid GMR grating. In some embodiments, exciting 310 a GMR comprises coupling a first signal portion of an input signal into a waveguide layer using a diffraction grating of the hybrid GMR grating. The first signal portion has a frequency that is within a coupling bandwidth of a GMR resonant frequency of the hybrid GMR grating. The coupling bandwidth is defined as a band of frequencies around a GMR resonant frequency at which a signal is coupled into the hybrid GMR grating.

The method 300 of optical filtering further comprises reflecting 320 a second signal portion of the input signal. In particular, the second signal portion comprises frequency components that are outside of the coupling bandwidth. As such, the second signal portion is essentially at a frequency that differs or is away from the GMR resonant frequency. Reflecting 320 a second signal portion uses distributed Bragg reflection of a distributed Bragg reflector (DBR) of the hybrid GMR grating. According to some embodiments, the DBR is between the diffraction grating and the waveguide layer of the hybrid GMR grating. In other embodiments, the waveguide layer is between the diffraction grating and the DBR. Either way, the DBR reflects 320 the second signal portion. The reflected 320 second signal portion is referred to as a reflected signal. In some embodiments, the method 300 employs any of the embodiments of the hybrid GMR grating 100 described above.

In some embodiments of the method 300 of optical filtering, the first signal portion that is coupled into the waveguide layer is essentially fully absorbed within the waveguide layer. The full absorption may be provided by a static property of the waveguide layer, for example. In another example, the full absorption may be controllable (e.g., modulated or switch on and off) such that the first signal portion is only full absorbed when the controllable full absorption is activated. In other embodiments, the first signal portion that is coupled into the waveguide layer is essentially transmitted through and out of the waveguide layer as a transmitted signal.

In some embodiments of the method 300 of optical filtering, the method 300 further comprises coupling 330 the reflected signal into another hybrid GMR grating, as is further illustrated in FIG. 5 by way of example. In some of these embodiments, the other hybrid GMR grating has another GMR resonant frequency. For example, the other GMR frequency of the other hybrid GMR grating may be higher or lower. Coupling 330 the reflected signal comprises coupling a portion of the reflected signal at the other GMR resonant frequency into a waveguide layer of the other hybrid GMR grating using a diffraction grating of the other hybrid GMR grating.

In some embodiments of the method 300 of optical filtering, the method 300 further comprises reflecting 340 another portion of the reflected signal at a frequency that differs from the other GMR resonant frequency, as is also further illustrated in FIG. 5 by way of example. Reflecting 340 another portion uses distributed Bragg reflection of another DBR that is either between the diffraction grating and the waveguide layer or on an opposite side of the waveguide layer from the diffraction grating of the other hybrid GMR grating. The other portion of the reflected signal is another reflected signal. The result is cascaded optical filtering of the input signal according to some embodiments of the method 300.

Thus, there have been described embodiments of a hybrid GMR grating, an optical filter, and a method of optical filtering that employ distributed Bragg reflection. It should be understood that the above-described embodiments are merely illustrative of some of the many specific embodiments that represent the principles of the present invention. Clearly, those skilled in the art can readily devise numerous other arrangements without departing from the scope of the present invention as defined by the following claims.

What is claimed is:

1. A hybrid guided-mode resonance (GMR) grating comprising:
   a waveguide layer that supports a guided-mode resonance (GMR) having a GMR resonant frequency;
   a diffraction grating that couples a portion of a signal incident on the hybrid GMR grating into the waveguide layer, the coupled portion having a frequency corresponding to the GMR resonant frequency; and
   a distributed Bragg reflector (DBR) that reflects another portion of the incident signal, the other portion having a frequency that is away from the GMR resonant frequency.

2. The hybrid GMR grating of claim 1, wherein one of the waveguide layer is between the diffraction grating and the DBR and the DBR is between the waveguide layer and the diffraction grating.

3. The hybrid GMR grating of claim 1, wherein one or more of the DBR is within the waveguide layer, the diffraction grating is within the waveguide layer, the diffraction grating is within a surface of the DBR, and the diffraction grating is on a surface of either the waveguide layer or the DBR.

4. The hybrid GMR grating of claim 1, wherein the waveguide layer comprises an absorber that absorbs a signal coupled into the waveguide layer by the diffraction grating.

5. The hybrid GMR grating of claim 4, wherein absorption by the absorber is controllable to modulate the coupled signal such that the hybrid GMR grating is a modulator of the coupled signal.

6. The hybrid GMR grating of claim 1, wherein the diffraction grating comprises is a one-dimensional diffraction grating.

7. The hybrid GMR grating of claim 6, wherein the one-dimensional diffraction grating comprises a periodic array of dielectric features formed in a dielectric layer that overlies the DBR.

8. The hybrid GMR grating of claim 6, wherein the one-dimensional diffraction grating comprises a surface profile of surface features formed one or both of in a surface and on a surface of the hybrid GMR grating.

9. The hybrid GMR grating of claim 1, wherein the diffraction grating comprises a two-dimensional diffraction grating that comprises one or both of an array of dielectric features formed in a surface layer and surface features formed one or both of in a surface and on a surface of the hybrid GMR grating.

10. The hybrid GMR grating of claim 1 used in a cascaded optical filter comprising a plurality of hybrid GMR gratings arranged as a sequential cascade, each hybrid GMR grating of the sequential cascade having a different GMR resonant frequency.

11. An optical filter comprising:
a coupler that receives an optical signal; and
a hybrid guided-mode resonance (GMR) grating comprising:
  a GMR grating having a first GMR resonant frequency; and
  a distributed Bragg reflector (DBR), one of the DBR being between a diffraction grating and a waveguide layer of the GMR grating and the waveguide layer being between the diffraction grating and the DBR,
wherein the coupler couples the received optical signal into the hybrid GMR grating and further receives and couples out a reflected signal from the hybrid GMR grating.

12. The optical filter of claim 11, further comprising another hybrid GMR grating having a second GMR resonant frequency, the other hybrid GMR grating receiving the reflected signal from the coupler.

13. A method of optical filtering, the method comprising:
exciting a guided-mode resonance (GMR) in a GMR grating by coupling a first signal portion of an input signal into a waveguide layer of the GMR grating using a diffraction grating of the GMR grating, the first signal portion having a frequency within a coupling bandwidth of a GMR resonant frequency of the GMR grating; and
reflecting a second signal portion of the input signal at a frequency that is outside of the coupling bandwidth of the GMR resonant frequency using distributed Bragg reflection of a distributed Bragg reflector (DBR), the second signal portion being a reflected signal,
wherein either the DBR is between the diffraction grating and the waveguide layer or the waveguide layer is between the diffraction grating and the DBR.

14. The method of optical filtering of claim 13, wherein the first signal portion that is coupled into the waveguide layer is one of absorbed within the waveguide layer and transmitted by the waveguide layer as a transmitted signal.

15. The method of optical filtering of claim 13, further comprising cascade optical filtering of the input signal that comprises:
coupling the reflected signal into another GMR grating having another GMR resonant frequency by coupling a portion of the reflected signal into a waveguide layer of the other GMR grating using a diffraction grating of the other GMR grating, the coupled portion of the reflected signal being within a coupling bandwidth of the other GMR resonant frequency of the other GMR grating; and
reflecting another portion of the reflected signal at a frequency outside of the coupling bandwidth of the other GMR resonant frequency using distributed Bragg reflection of another DBR of the other GMR grating, the other portion of the reflected signal being another reflected signal.

* * * * *

UNITED STATES PATENT AND TRADEMARK OFFICE
CERTIFICATE OF CORRECTION

PATENT NO. : 8,369,665 B2
APPLICATION NO. : 13/002763
DATED : February 5, 2013
INVENTOR(S) : David A. Fattal et al.

It is certified that error appears in the above-identified patent and that said Letters Patent is hereby corrected as shown below:

In the Claims:

In column 13, line 6, in Claim 6, after "comprises" delete "is".

Signed and Sealed this
Fourteenth Day of May, 2013

Teresa Stanek Rea
*Acting Director of the United States Patent and Trademark Office*